United States Patent [19]

Moreau et al.

[11] Patent Number: 5,294,585
[45] Date of Patent: Mar. 15, 1994

[54] PREPARATION OF PARTICULATE COMPOSITE MATERIAL WITH CARBON MATRIX

[75] Inventors: Serge Moreau, Velizy Villacoublay; Bernard Sardan, Le Chesnay; Pierre Ehrburger, Didenheim, all of France

[73] Assignee: L'Air Liquide, Societe Anonyme Pour l'Etude et l'Exploitation des Procedes Georges Claude, Paris, France

[21] Appl. No.: 725,469

[22] Filed: Jul. 3, 1991

[30] Foreign Application Priority Data

Jul. 17, 1990 [FR] France .................. 90 09090

[51] Int. Cl.$^5$ .................. B01J 20/10; B01J 20/08; B01J 20/04; B01J 20/20
[52] U.S. Cl. .................. 502/413; 95/130; 95/138; 502/182; 502/415; 502/417
[58] Field of Search .................. 502/413, 415, 417, 182

[56] References Cited

U.S. PATENT DOCUMENTS

| | | | |
|---|---|---|---|
| 4,125,482 | 11/1978 | Sinha | 502/417 |
| 4,178,270 | 12/1979 | Fujita et al. | 502/182 |
| 5,051,389 | 9/1981 | Lang et al. | 502/182 |

FOREIGN PATENT DOCUMENTS

| | | |
|---|---|---|
| 0107494 | 5/1984 | European Pat. Off. . |
| 0119924 | 9/1984 | European Pat. Off. . |
| 375658 | 5/1923 | Fed. Rep. of Germany . |
| 55-51436 | 4/1980 | Japan . |
| 61-212309 | 9/1986 | Japan . |
| 2075357 | 11/1981 | United Kingdom .......... 502/182 |

OTHER PUBLICATIONS

Anonymous, "Type CAL Granular Carbon," Calgon Corporation, Aug. 1986, pp. 23-105e et seq.
Chemical Abstract, vol. 93, No. 8, p. 177, Abstract No. 74869g.

Primary Examiner—Paul E. Konopka
Attorney, Agent, or Firm—Oliff & Berridge

[57] ABSTRACT

The present invention concerns a polyphase particulate composite material containing a microporous phase which is essentially carbon whose microporous volume is between 0.1 cm$^3$/g and 1 cm$^3$/g, which is associated with an amorphous mineral dispersed phase essentially consisting of an oxide of silicon, aluminum, titanium or magnesium disposed on the carbon phase, at a thickness of less than 10 nm. The invention is also concerned with a process for the preparation of these composite materials, and the use thereof as a molecular sieve.

7 Claims, 6 Drawing Sheets

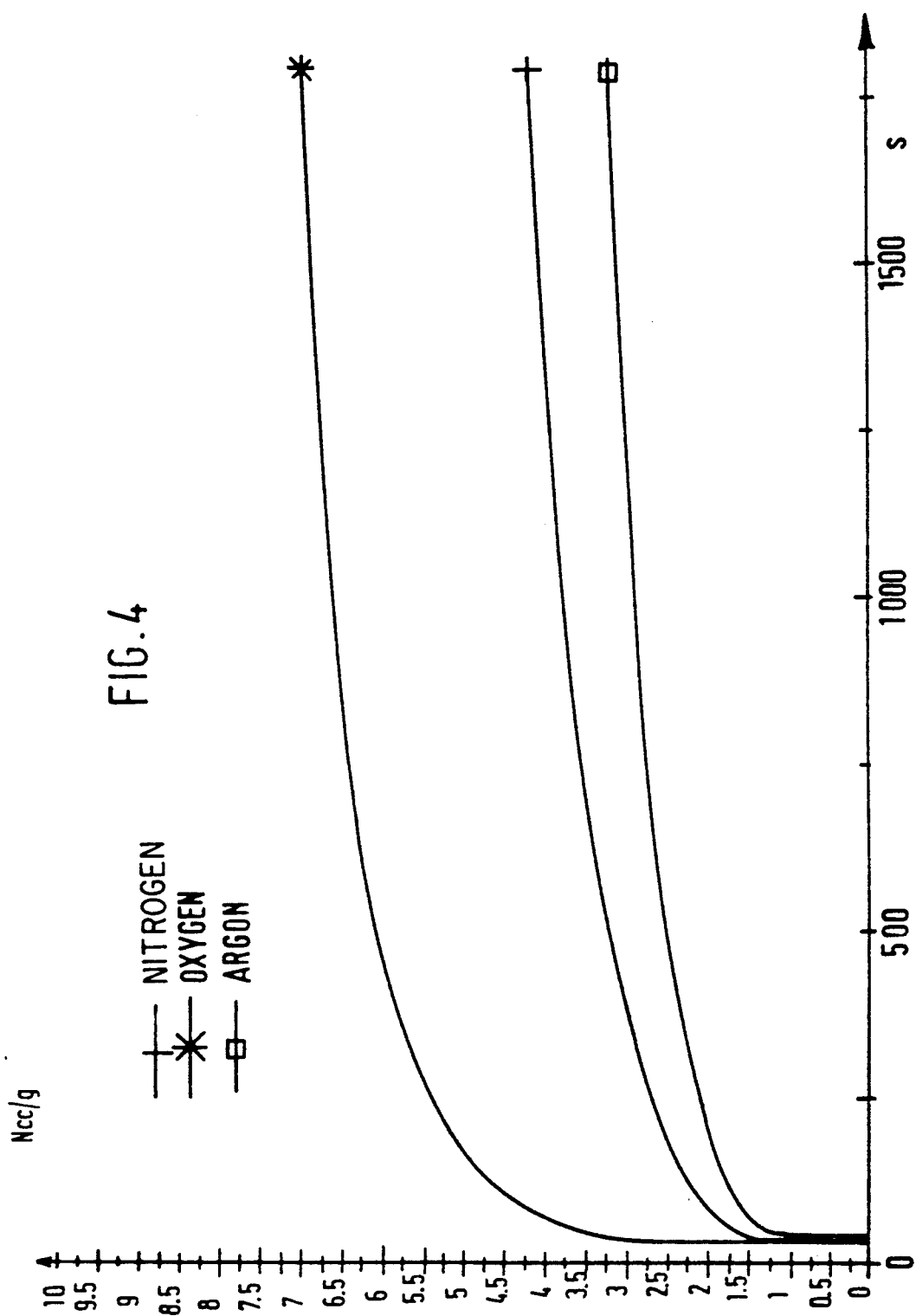

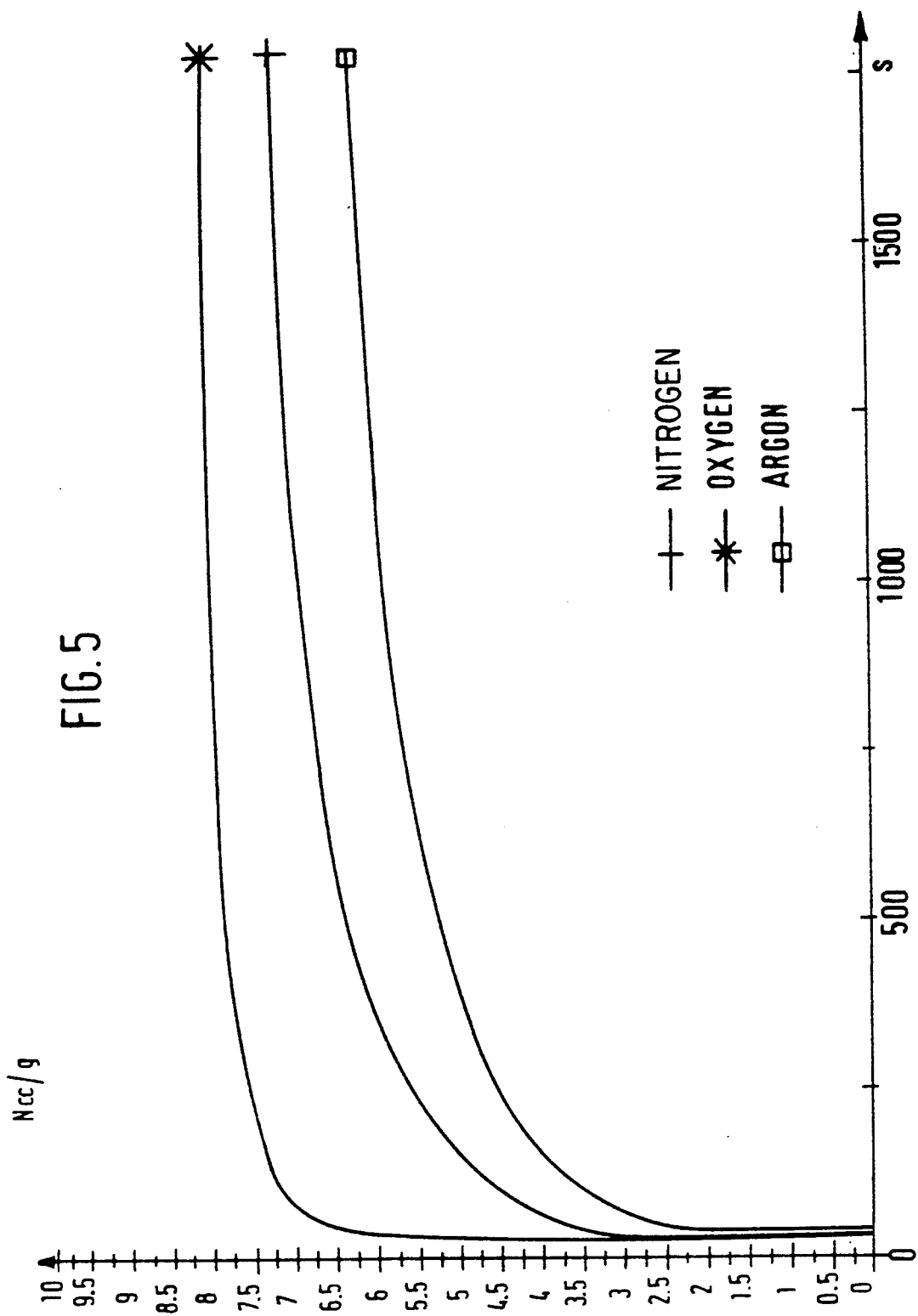

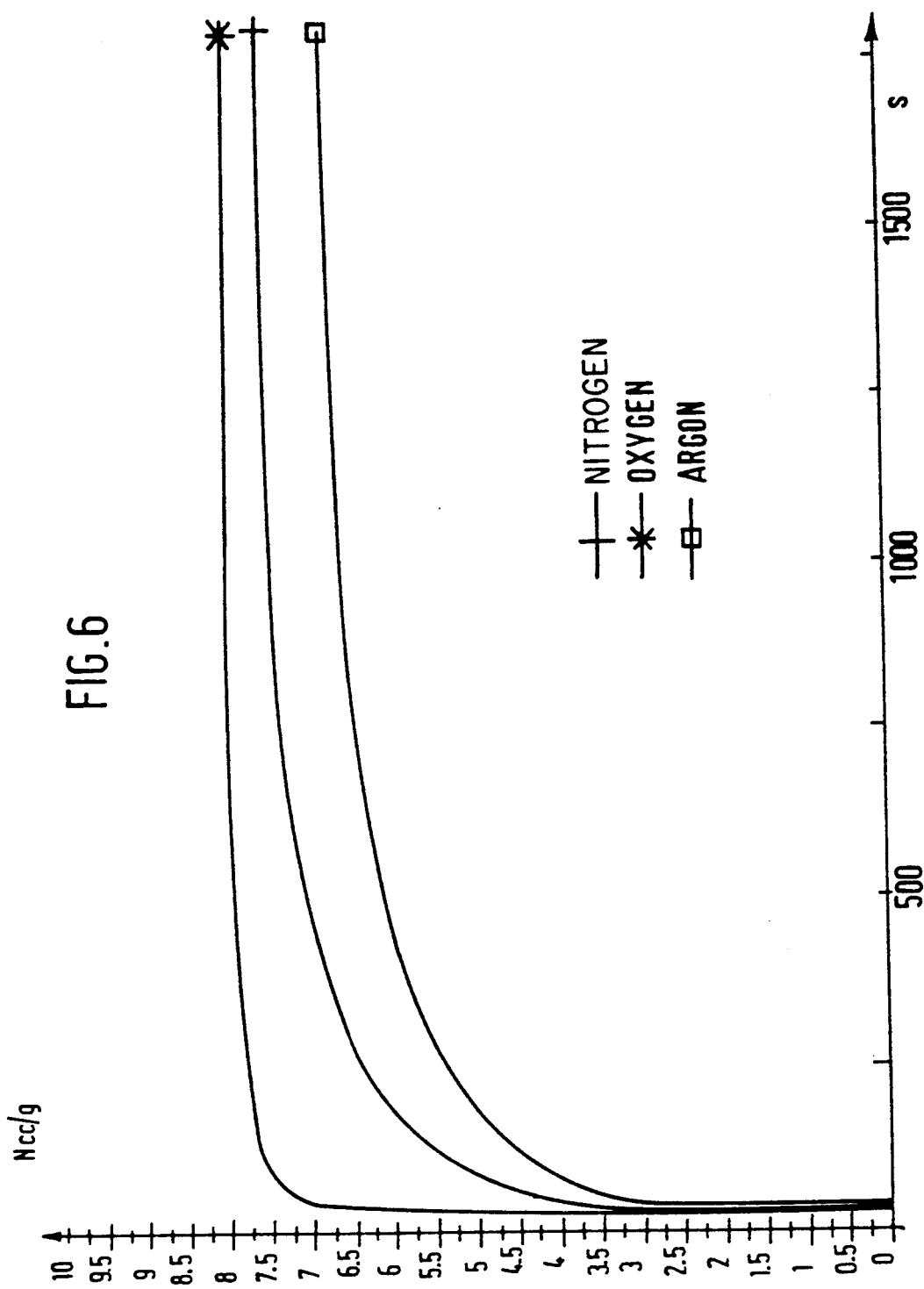

PREPARATION OF PARTICULATE COMPOSITE MATERIAL WITH CARBON MATRIX

BACKGROUND OF THE INVENTION (a) Field of the Invention

The present invention concerns particulate composite materials with carbon matrix, a process for the preparation of these composite materials and their application for the separation of molecules, such as for the adsorption of gases.

(b) Description of Prior Art

It is known, in the field of molecular separation and adsorption, to use activated carbon, i.e. porous carbon supports. One way to control the porosity consists in providing a carbon deposit on a carbon support, for example by pyrolysis or cracking, in general after heat activation.

These adsorbents have however the disadvantage of being essentially carbon and for this reason are sensitive to oxygen from the air and to polluting agents which, by adsorption, modify the characteristics of porosity and therefore of adsorption.

SUMMARY OF THE INVENTION

A particulate composite polyphase material has now been found which contains an essentially carbon microporous phase whose microporous volume is between 0.1 cm$^3$/g and 1 cm$^3$/g, which is associated with an amorphous mineral dispersed phase essentially consisting of a mineral oxide selected from the oxides of silicon, aluminum, titanium or magnesium, disposed on the carbonated phase, at a thickness of less than 10 nm.

The composite materials according to the invention, are less sensitive than carbon sieves, in particular while in contact with oxygen and organic polluting agents; and, quite a noticeable differentiation between oxygen and nitrogen has been observed.

An object of the present invention is to provide a process for the preparation of a polyphase composite particulate material, characterized in that an essentially carbon microporous particulate material is contacted with a precursor of a mineral oxide of the type comprising an oxide of silicon, aluminum, titanium or magnesium, and in that the matrix is heat treated to decompose the precursor in situ at the temperature of decomposition of the precursor on the matrix.

The carbon matrix according to the invention or which can be used in the process, may include activated carbon of plant origin, such as carbon from coconut, pine bark or charcoal, or of mineral origin, such as coal or anthracite, and more generally any non-crystalline carbon matrix having a porous structure.

The carbon matrix may be pre-treated in order to control its porosity for example by oxidation with oxygen, or water vapour or carbon dioxide, as is the case for activated carbon.

Notwithstanding its origin and the possible pre-treatments made on the matrix, the porosity of the latter is preferably between 0.1 cm$^3$/g and 1 cm$^3$/g.

The mineral oxides which constitute the dispersed phase may be selected among the oxides of silicon, aluminum, titanium or magnesium; and they are advantageously present in the composite material in an amount of 0.1 to 10% by weight, preferably from 0.5 to 5.5% by weight, at a thickness lower than 3 nm, preferably between 0.1 and 3 nm.

The amorphous dispersed phase modifies the porous structure of the entire carbon matrix on which it is disposed and as a result, it modifies the adsorption sites on and among the latter. With the oxide of silicon in the form of amorphous silica, excellent results are obtained.

The proportion of oxide incorporated into the matrix depends on the size and characteristics of adsorption of the molecules which are separated and the characteristics of the carbon matrix.

In order to separate the molecules by molecular screening, the size of the particles of composite material is between 0.5 and 5 mm.

The particles of the composite material may be obtained, either from the screened starting material, or from crushed material, screened and then agglomerated with a binder.

This process consists of contacting the matrix and the precursor of oxide and treating the mixture to decompose the precursor on the matrix and providing a deposit on the internal surface of the matrix. The decomposition temperature may be favorably comprised of between 350° and 650° C., preferably between 500° and 550° C.

The oxide precursor may include any volatile organic compound which can be cracked containing silicon, magnesium, titanium or aluminum, such as alkoxides or acid salts, as well as any volatile compound which, by decomposition under heat, gives a stable inorganic residue. As preferred alkoxides, the methoxy, ethoxy and propoxy derivatives may be mentioned. The preferred salts of acid are chlorides and bromides. In particular, compounds of the type aluminum ethoxide may be used as a precursor of aluminum oxide, as precursor of silica tetraethoxysilane may be used, and as precursor of titanium oxide, titanium(IV)isopropoxide may be used.

It may be advantageous to pre-treat the carbon matrix in order to desorb the chemical species which are adsorbed by the matrix, such as oxygen. This pre-treatment may take place under vacuum or in a gas which is chemically inert towards carbon, and at temperatures which are compatible with the matrix, i.e. lower than 1300° C., for example of the order of 500° C. to 1000° C.

Contact of the matrix with the precursor may be carried out while the precursor is in gaseous phase, by adsorption of the precursor by the matrix. This contact may be carried out under a pressure which corresponds to the vapor pressure of the precursor, by means of consecutive steps or continuously. It may also be carried out under a higher pressure, the partial pressure of the precursor remaining the vapor pressure of the precursor while in the presence of an inert gas carrying a gaseous precursor. The contact of the matrix with the precursor may also be carried out by liquid injection in a sealed enclosure. Under these conditions, the decomposition of the precursor and the deposit are carried out under pressures higher than the vapor pressure of the precursor. The influence of the presence of the reaction products is here completely different than that of the deposits under a saturating pressure.

The annexed FIGS. 5 and 6 illustrate variations of the kinetic conditions.

Adsorption may take place at room temperature or at a temperature lower than that of the heat treatment.

The heat treatment which follows enables the decomposition of the precursor and the deposit of the oxide in situ, on the entire internal surface of the matrix.

The adsorption and the heat treatment may also be carried out simultaneously.

In the particular case of tetraethoxysilane, which is a precursor of silicon, the decomposition temperature is about 600° C.

Once the deposit has been produced, it may be advantageous to remove the residual amounts of the precursor remaining in the matrix from the composite material, by means of a post heat treatment under vacuum or by flushing a neutral gas, at a temperature which is compatible with the stability of the matrix, i.e. lower than about 1300° C., for example between 500° C. and 1000° C.

For example, nitrogen or argon are used as a carrier gas when contacting the oxide precursor and the matrix, or as chemically inert gas towards carbon or in both cases.

The composite materials according to the invention, i.e. the carbon materials in which the adsorption sites are modified by deposits of mineral oxides have determined the properties of adsorption of molecules. A controlled deposit enables one to make materials specific with respect to certain molecules and to make them useful in selective adsorption. Consequently, the new composite materials find application in the separation of molecules by molecular screening. In particular, they may advantageously be used for the separation of gases, such as gases from air, for example nitrogen, oxygen and argon.

The technique of adsorption by pressure variation (PSA, Pressure Swing Adsorption) may be applied with these composite materials when used as adsorbent for the separation of gases.

BRIEF DESCRIPTION OF DRAWINGS

The annexed drawings represent the volume of gases from the air which have been adsorbed (+ Nitrogen, * Oxygen, Argon Ncm$^3$/g of adsorbent, ordinate) as a function of time(s) (abscissa).

FIG. 4 is a comparative view, for activated carbon based on charcoal of the type activated carbon 2/10 BK R of CECA pre-treated, heated twice under vacuum at 950° C. during 4 hours;

FIG. 5 is a similar view for the same activated carbon, pre-treated similarly as at 4, including an injection of tetraethoxysilane on 170 mg of carbon in sealed capsule, followed by heating at 550° C. during one day;

FIG. 6 is a similar view for the same activated carbon, pre-treated in the same manner and with a different injection of tetraethoxysilane in sealed capsule, followed by heating at 550° C. during one and a half day.

Figure 1:
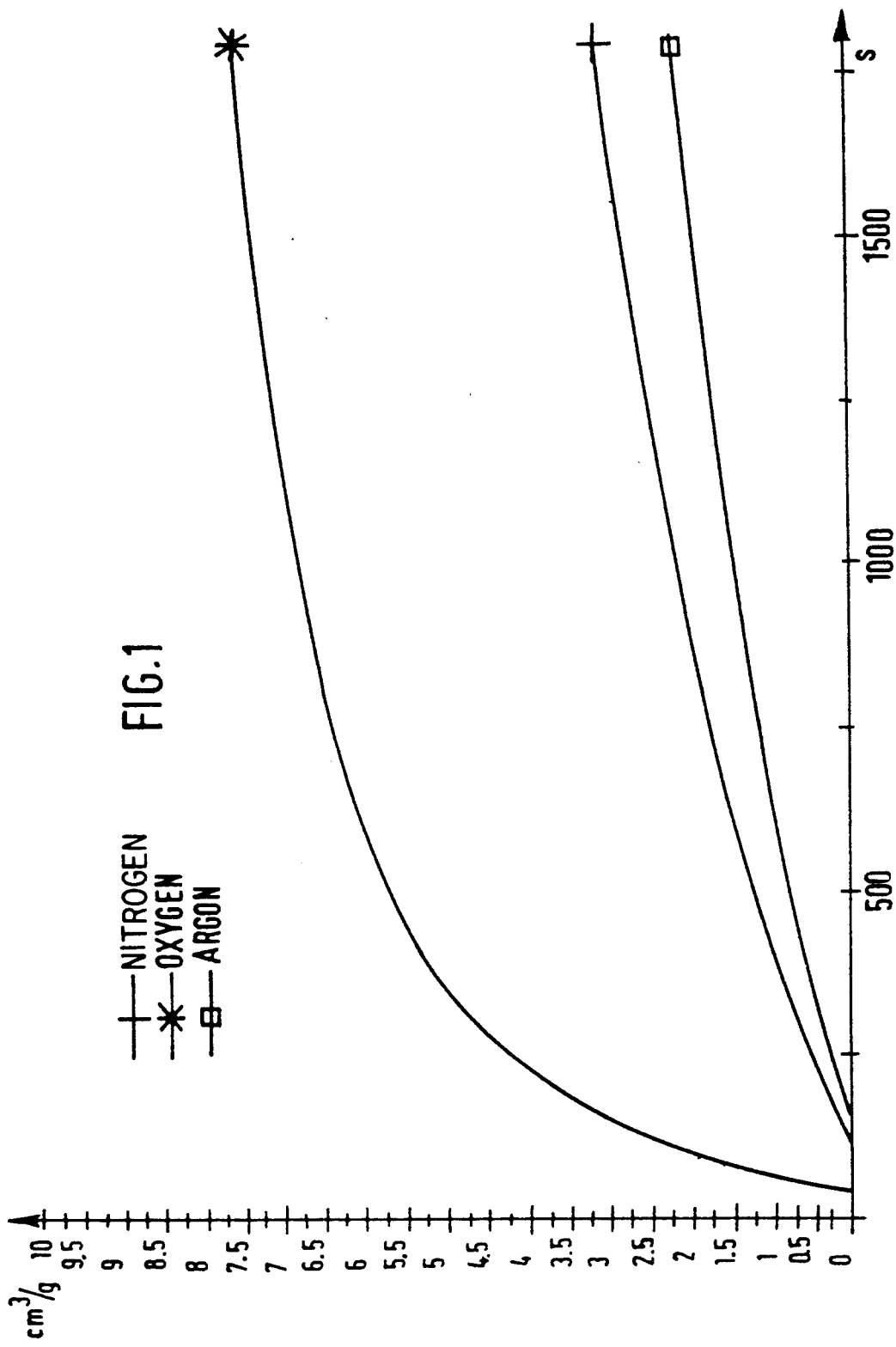
FIG. 1 is a comparative figure, for an activated carbon based on calcined coconut by treatment at 950° C. during four hours under argon, then at 950° C. during three hours under vacuum.
Figure 2:
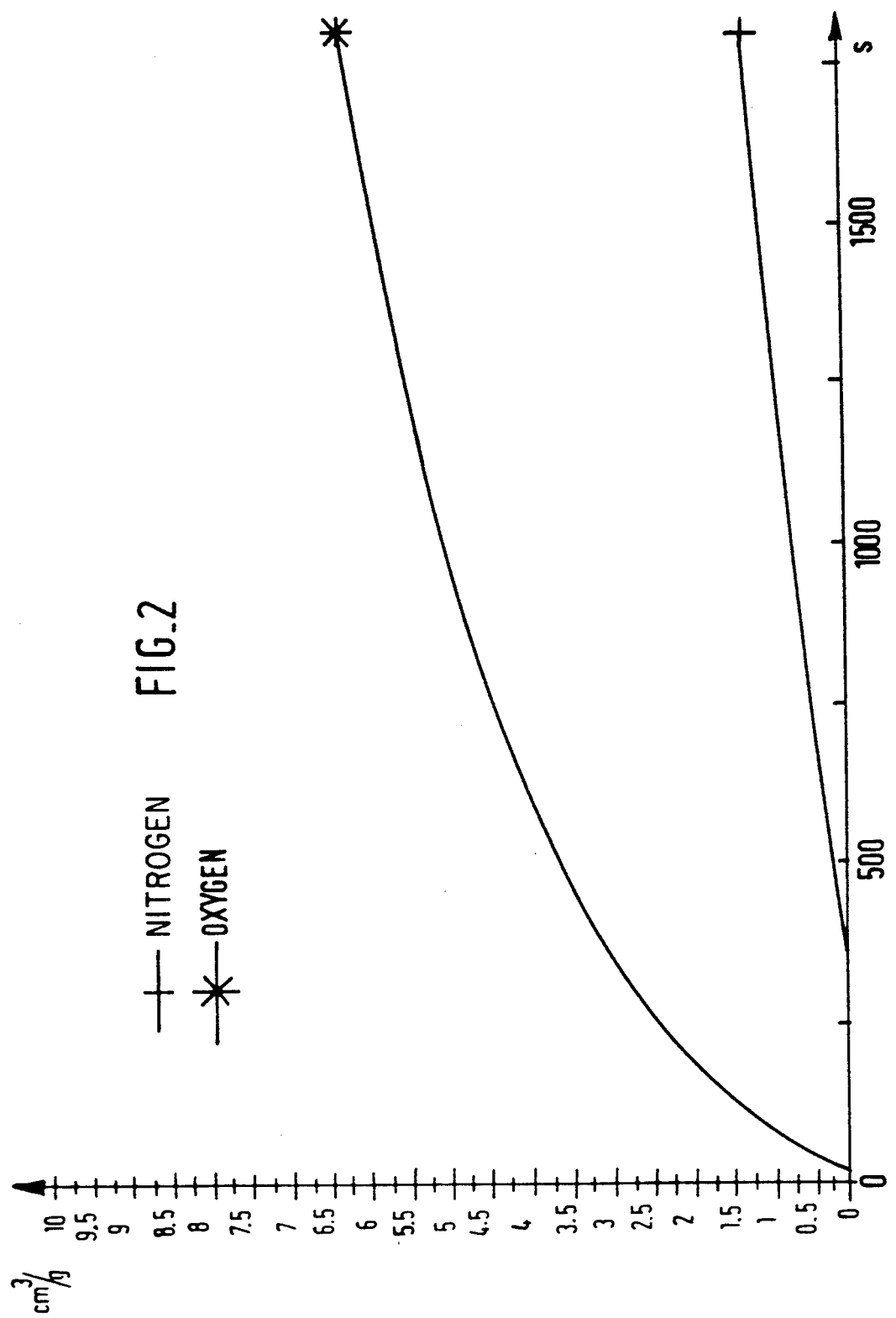
FIG. 2 is a similar view for the same calcined coconut by pre-treatment at 950° C. during four hours, then treatment with tetraethoxysilane under saturating vapor pressure, resulting in a deposit of 1.3% by weight of silica, then a post-treatment during 8 h at 950° C.
Figure 3:
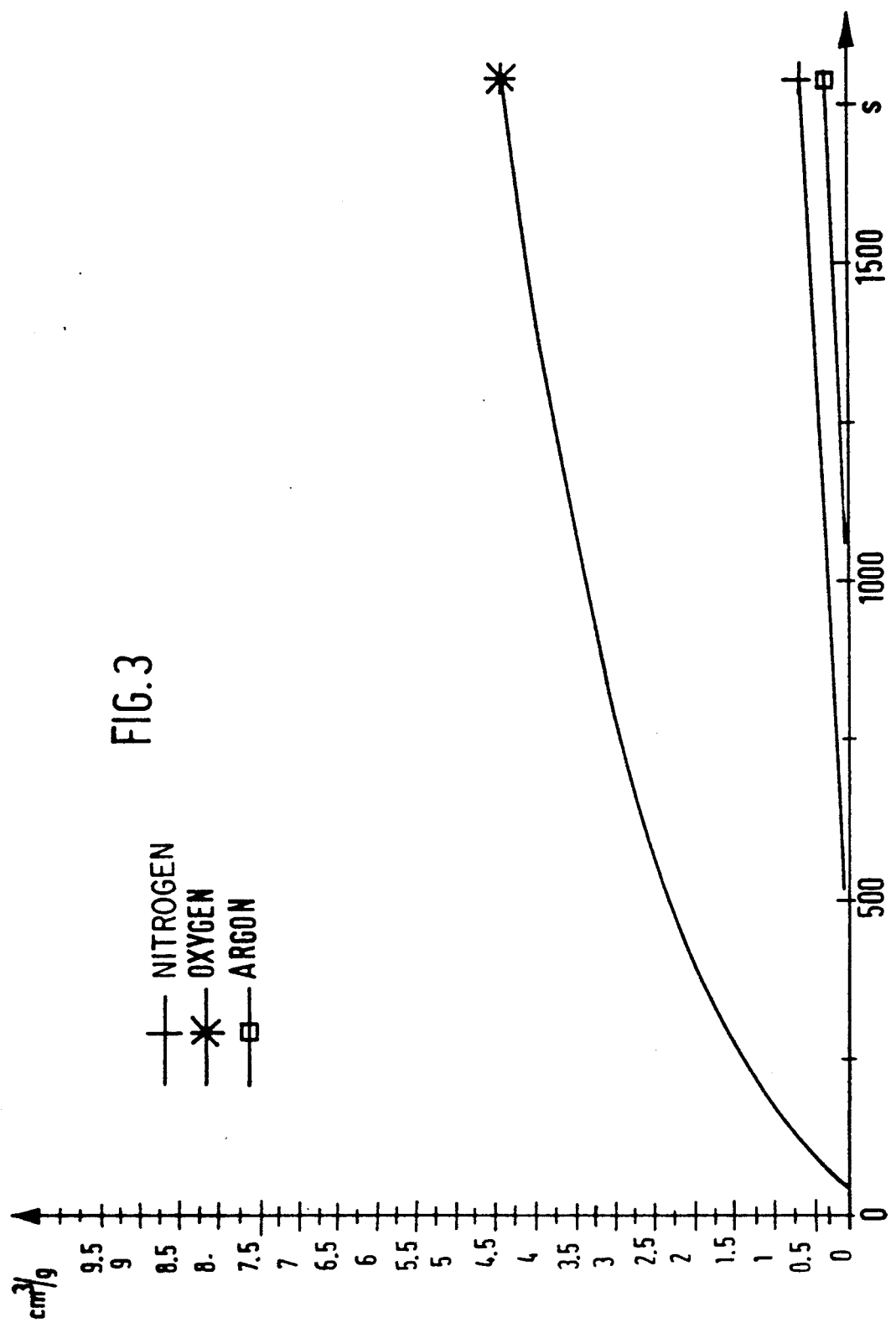
FIG. 3 is a similar view for the same coconut calcined by pre-treatment at 950° C. during 4 hours, then treatment with tetraethoxysilane with a deposit of 0.7% SiO$_2$, then post-treatment at 950° C. during 8 hours.

The deposits have been made under pressure, the treatment was carried out at 550° C. in sealed capsule under an atmosphere of argon. The residues have been removed by a post-heat treatment under vacuum at 950° C. during 4 hours.

In the case where the final composite material would present a porosity which is too tight by reason of an excess of tetraethoxysilane, it is possible to provide a subsequent oxidizing treatment, with water vapor, oxygen or carbon dioxide, to give the desired porosity.

We claim:

1. Process for the preparation of composite particulate material, which comprises contacting an essentially carbon microporous particulate matrix with a volatile gaseous precursor, said precursor comprising silicon, aluminum, titanium or magnesium, and heat treating the matrix to decompose the precursor on the matrix in situ at the temperature of decomposition of the volatile precursor and form said material, wherein said material includes an essentially carbon microporous phase having a microporous volume between 0.1 and 1 cm$^3$/g, associated with an amorphous mineral dispersed phase essentially containing a mineral oxide selected from the group consisting of silicon, aluminum, titanium and magnesium oxides, disposed on the carbon phase to a thickness of less than 10 nm.

2. Process according to claim 1, wherein the contacting and the decomposition are simultaneous.

3. Process according to claim 1, further comprising, prior to said contacting, pretreating the matrix by heating under vacuum or by flushing with a neutral gas.

4. Process according to claim 1, further comprising post-heat treating the matrix with a neutral gas or under vacuum at the temperature of the decomposition of residual precursor materials.

5. Process according to claim 4, further comprising, after decomposition of residual precursor materials, carrying out on the matrix a supplemental heat-treatment to modify the microporous volume of said composite.

6. Process according to claim 1, wherein the precursor is a salt of an acid or an alkoxide of silicon, aluminum, titanium or magnesium.

7. Process according to claim 6, wherein said precursor consists of tetraethoxysilane.

* * * * *